United States Patent
Kato

(10) Patent No.: US 9,630,471 B2
(45) Date of Patent: Apr. 25, 2017

(54) VEHICULAR DUST COVER ASSEMBLY AND MANUFACTURING METHOD THEREOF

(71) Applicant: SUMITOMO RIKO COMPANY LIMITED, Komaki-shi, Aichi (JP)

(72) Inventor: Kenichi Kato, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 13 days.

(21) Appl. No.: 14/957,037

(22) Filed: Dec. 2, 2015

(65) Prior Publication Data

US 2016/0089952 A1 Mar. 31, 2016

Related U.S. Application Data

(63) Continuation of application No. PCT/JP2015/052843, filed on Feb. 2, 2015.

(30) Foreign Application Priority Data

Mar. 12, 2014 (JP) ................................. 2014-048840

(51) Int. Cl.
*B60G 99/00* (2010.01)
*F16F 9/38* (2006.01)
(Continued)

(52) U.S. Cl.
CPC ............ *B60G 99/002* (2013.01); *B60G 11/24* (2013.01); *B60G 15/067* (2013.01); *F16F 9/38* (2013.01);
(Continued)

(58) Field of Classification Search
CPC .... B60G 99/002; B60G 11/24; B60G 15/067; F16F 9/38; F16F 9/54; F16J 9/465
See application file for complete search history.

(56) References Cited

U.S. PATENT DOCUMENTS

| 5,944,154 | A | * | 8/1999 | Pees ..................... B60G 15/068 188/315 |
| 6,648,110 | B2 | | 11/2003 | Nakamura |
| 2010/0127437 | A1 | * | 5/2010 | Stevens ..................... F16F 9/58 267/64.11 |

FOREIGN PATENT DOCUMENTS

| JP | H05-14690 U | 2/1993 |
| JP | H06-137357 A | 5/1994 |

(Continued)

OTHER PUBLICATIONS

Mar. 10, 2015 International Search Report issued in Patent Application No. PCT/JP2015/052843.
(Continued)

*Primary Examiner* — Vishal Sahni
(74) *Attorney, Agent, or Firm* — Oliff PLC

(57) ABSTRACT

A vehicular dust cover assembly including: an upper support; a bound stopper and a dust cover assembled to the upper support; and an engaging step provided on an outer circumferential surface of the bound stopper. A top end part of the dust cover is externally fit to a top end part of the bound stopper. The upper support includes an outer metal fitting having a fitting recess within which the top end part of the bound stopper is fit and assembled. An engaging projection is provided projecting on an inner surface of the fitting recess to be engaged with the engaging step with the dust cover interposed therebetween. The bound stopper includes an axial pushing operation surface exposed facing axially downward which is provided at a lower side than the engaging step and at a position inside the fitting recess.

10 Claims, 5 Drawing Sheets

(51) Int. Cl.
*F16F 9/54* (2006.01)
*F16J 3/04* (2006.01)
*B60G 11/24* (2006.01)
*B60G 15/06* (2006.01)

(52) U.S. Cl.
CPC .............. *F16F 9/54* (2013.01); *F16J 3/041* (2013.01); *B60G 2202/32* (2013.01); *B60G 2204/125* (2013.01); *B60G 2204/128* (2013.01); *B60G 2204/20* (2013.01); *B60G 2204/4502* (2013.01)

(56) References Cited

FOREIGN PATENT DOCUMENTS

| JP | H08-121525 A | 5/1996 |
| JP | 2001-003973 A | 1/2001 |
| JP | 2008-309201 A | 12/2008 |
| JP | 2013-142463 A | 7/2013 |
| JP | 2014062560 | * 4/2014 |

OTHER PUBLICATIONS

Sep. 13, 2016 International Preliminary Report on Patentability issued in International Patent Application No. PCT/JP2015/052843.

* cited by examiner

VEHICULAR DUST COVER ASSEMBLY AND MANUFACTURING METHOD THEREOF

INCORPORATED BY REFERENCE

The disclosure of Japanese Patent Application No. 2014-048840 filed on Mar. 12, 2014, including the specification, drawings and abstract is incorporated herein by reference in its entirety. This is a Continuation of International Application No. PCT/JP2015/052843 filed on Feb. 2, 2015.

BACKGROUND OF THE INVENTION

1. Field of the Invention

The present invention relates to a dust cover assembly mounted on a shock absorber constituting a vehicular suspension mechanism, and a manufacturing method of the dust cover assembly.

2. Description of the Related Art

From the past, with the object of preventing foreign matter such as rain, dust or the like from penetrating the sliding part of a piston rod, a dust cover that encloses around the piston rod is mounted on the shock absorber constituting the suspension mechanism of a vehicle such as an automobile or the like. Also, to prevent damage or impact due to excessive contraction of the shock absorber when there is excessive external input to the suspension mechanism, a bound stopper formed with an elastic body is externally inserted on the piston rod.

However, as a structure for assembling both the dust cover and the bound stopper to the shock absorber, it is also possible to apply an integrally molded article of the dust cover and the bound stopper as disclosed in Japanese Unexamined Patent Publication No. JP-A-2001-3973. However, the dust cover and the bound stopper have different required characteristics, so when using the integrally molded article, there is the problem that it is not possible to select respectively suitable materials.

In light of that, in many cases, a respectively separately formed dust cover and bound stopper are used. Also, the separately formed dust cover and bound stopper, as described in U.S. Pat. No. 6,648,110 for example, can be assembled on an upper support for attaching the shock absorber piston rod to the vehicle body. In specific terms, with the outer metal fitting of the upper support fixed to the vehicle body being a cup shaped press formed article, while the bound stopper is fit and held on the peripheral wall inner surface of this outer metal fitting, the dust cover is blow molded and simultaneously externally fit and fixed to the peripheral wall outer surface of the outer metal fitting.

However, with this kind of prior art assembly structure, the externally fit and fixed part of the dust cover to the outer metal fitting is exposed to the outside, so there was the risk of damage occurring due to splashing of stones or the like while the vehicle is traveling and having the dust cover fall off. Also, when it is difficult to use a round cylinder shaped outer circumferential surface with the outer metal fitting, there was the problem that it was not possible to even do external fitting and fixing of the dust cover in the first place.

SUMMARY OF THE INVENTION

The present invention has been developed in view of the above-described matters as the background, and it is an object of the present invention to provide a vehicular dust cover assembly with a novel structure and a novel manufacturing method of a vehicular dust cover assembly, for which it is possible to easily assemble a separately formed dust cover and bound stopper to an upper support, and possible to stably maintain the assembled state.

A first mode of the present invention provides a vehicular dust cover assembly comprising: an upper support configured to mount a shock absorber to a vehicle body; a bound stopper and a dust cover assembled to the upper support; and an engaging step provided on an outer circumferential surface of the bound stopper, wherein a top end part of the dust cover is externally fit to a top end part of the bound stopper while being overlapped on the engaging step, the upper support includes an outer metal fitting configured to be fixed to the vehicle body, and having a fitting recess within which the top end part of the bound stopper is fit and assembled, an engaging projection is provided projecting on an inner surface of the fitting recess and the engaging projection is engaged with the engaging step with the dust cover interposed therebetween so that the bound stopper and the dust cover are retained and held in relation to the outer metal fitting, and the bound stopper includes an axial pushing operation surface exposed facing downward in an axial direction of the dust cover, the pushing operation surface being provided at a lower side than the engaging step of the bound stopper and at a position inside the fitting recess of the outer metal fitting.

With the vehicular dust cover assembly constituted according to this mode, the dust cover is externally fit to the bound stopper and together with the bound stopper is fit into the fitting recess of the outer metal fitting. Also, by having the dust cover sandwiched between engaging parts of the bound stopper engaging step and the outer metal fitting engaging projection, the dust cover is retained and held to the outer metal fitting together with the bound stopper.

Because of that, the assembly part of the dust cover to the outer metal fitting is positioned inside the fitting recess, and since exposure of the outer metal fitting to the outer circumferential surface is avoided, damage due to splashing of stones or the like when the vehicle is traveling is prevented. In fact, regardless of the outer circumferential surface shape of the outer metal fitting, it is possible to assemble the dust cover to the outer metal fitting, and there is a significant improvement in the level of freedom of design of the outer metal fitting.

Also, a pushing operation surface exposed facing downward in the axial direction is formed on the bound stopper for which the dust cover is overlapped on the outer circumferential surface, and it is possible to effectively apply on the pushing operation surface an external force for fitting the bound stopper into the fitting recess. By doing this, the bound stopper for which the dust cover was externally fit is not obstructed by the dust cover, making it possible to easily fit into the fitting recess and assemble to the outer metal fitting.

A second mode of the present invention provides the vehicular dust cover assembly according to the first mode, wherein the engaging projection of the outer metal fitting includes an engaging surface located at a top side than its apex and overlapping the engaging step of the bound stopper with the dust cover interposed therebetween and a tapered guide surface that gradually expands facing downward located at a lower side than the apex, and an external diameter dimension of the pushing operation surface is made to be larger than an inner diameter dimension of the engaging projection of the outer metal fitting.

With the vehicular dust cover assembly constituted according to this mode, when an external force is applied to the pushing operation surface of the bound stopper and the bound stopper is fit into the fitting recess of the outer metal fitting, by the outer circumferential surface of the bound stopper being guided by the guide surface formed on the outer metal fitting, it is possible to even more easily assemble the bound stopper.

Also, at the lower side than the engaging step of the bound stopper, it is possible to ensure a sufficiently large surface area for the pushing operation surface, so work is easy when pushing the pushing operation surface upward in the axial direction. Also, since it is also easy to ensure volume of the part of the pushing operation surface for which the pushing force acts with an expanding diameter, there is a reduction in local concentration of stress that accompanies the pushing force action, so while avoiding adverse effects on the bound stopper, it is possible to assemble the bound stopper for which the dust cover is externally fit and the outer metal fitting using an even greater pushing force.

A third mode of the present invention provides the vehicular dust cover assembly according to the first or second mode, wherein the outer metal fitting includes a tapered abutting surface that gradually narrows facing upward provided on an inner circumferential surface upward from the engaging projection in the fitting recess thereof, the bound stopper includes a tapered overlapping surface that gradually narrows facing upward on the outer circumferential surface upward from the engaging step, and the overlapping surface of the bound stopper is covered by the top end part of the dust cover while being overlapped on the abutting surface of the outer metal fitting sandwiching the dust cover.

With the vehicular dust cover assembly constituted according to this mode, the engaging step and the overlapping surface of the bound stopper both overlap in the axial direction on the engaging projection and the abutting surface of the outer metal fitting sandwiching the dust cover. By doing this, in a state assembled to the fitting recess of the outer metal fitting, the bound stopper and the dust cover can be aligned at both sides in the axial direction and held in relation to the outer metal fitting even more reliably.

A fourth mode of the present invention provides the vehicular dust cover assembly according to any one of the first through third modes, wherein the engaging step of the bound stopper and the engaging projection of the outer metal fitting are both formed along an entire circumference in a circumferential direction.

With the vehicular dust cover assembly according to any one of the first through third modes, it is also possible to provide a suitable number of engaging steps and engaging projections having a designated length partially on the circumference, but with this mode, by forming the engaging step and the engaging projection along the entire circumference, it is possible to more effectively obtain assembly holding force of the bound stopper and the dust cover on the outer metal fitting.

A fifth mode of the present invention provides the vehicular dust cover assembly according to any one of the first through fourth modes, wherein the pushing operation surface of the bound stopper is formed along an entire circumference in a circumferential direction.

With the vehicular dust cover assembly of other modes of the present invention, it is possible to provide a suitable number of pushing operation surfaces having a designated length partially on the circumference, but by forming the pushing operation surface along the entire circumference according to this mode, not only is it possible to make it easier to ensure a large surface area of the pushing operation surface for which assembly force is applied, but it is also possible to have the assembly force act roughly equally along the entire circumference, so it is possible to realize assembly work even more smoothly.

A sixth mode of the present invention provides the vehicular dust cover assembly according to any one of the first through fifth modes, wherein the bound stopper includes a groove-shaped constricted part extending in a circumferential direction provided on the outer circumferential surface thereof, and the pushing operation surface is located to an upper side than the constricted part.

With the vehicular dust cover assembly constituted according to this mode, when a compression load in the axial direction is applied as the assembly force to the pushing operation surface of the bound stopper, it is possible to avoid the occurrence of plastic deformation type damage that comes with concentration of distortion or stress on the constricted part. Said another way, it is possible to apply a large assembly force while avoiding adverse effects on the expected characteristics of the bound stopper, and ensuring stable elastic characteristics of the bound stopper.

A seventh mode of the present invention provides the vehicular dust cover assembly according to any one of the first through sixth modes, wherein at the lower side than the engaging step of the bound stopper, the bound stopper inserted internally in the dust cover inside the fitting recess of the outer metal fitting is assembled in a non-compressed state in a radial direction without pressing on an inner circumferential surface of the dust cover.

With the vehicular dust cover assembly constituted according to this mode, when the bound stopper is assembled to the dust cover, the abutting force of the outer circumferential surface on the dust cover inner circumferential surface at the lower side region than the engaging step is made small to inhibit the friction force, so assembly work is easy.

Also, with the vehicular dust cover assembly of the present invention, though the material of each member is not specifically limited, since the dust cover is fit into the outer metal fitting and assembled, it is not necessary to provide a fitting surface of the dust cover on the outer circumference of the outer metal fitting as was described with U.S. Pat. No. 6,648,110, and the degree of design freedom of the outer circumference shape of the outer metal fitting is greater. Because of that, the present invention can be applied advantageously to the vehicular dust cover assembly equipped with an outer metal fitting consisting of a die cast molded article of an aluminum alloy, for example, and it is possible to easily set an irregularly shaped outer circumferential surface shape for the outer metal fitting.

Yet further, since it is possible to separately form the dust cover and the bound stopper, it is possible to combine with a bound stopper consisting of for example an elastic material of a foamed rubber elastic body or foamed urethane or the like, and use a dust cover made of an elastomer, and by doing that, it is possible to realize even more advantageously an improvement in dust cover lightness, durability and the like.

Furthermore, with the present invention, also characterized is a manufacturing method of a vehicular dust cover assembly including an upper support configured to be mounted on a vehicle body and a bound stopper configured to be externally inserted and mounted on a piston rod of a shock absorber, upon fitting and assembling a top end part of the bound stopper into a fitting recess of an outer metal fitting of the upper support, the method comprising steps of: (a) preparing the bound stopper to have an engaging step provided on its outer circumferential surface, and a pushing operation surface with a larger outer diameter than an inner diameter of the engaging step provided at a lower side than the engaging step; (b) preparing the outer metal fitting to have an engaging projection provided projecting on an inner surface of the fitting recess, the engaging projection being configured to be engaged with the engaging step of the bound stopper so as to retain and hold the bound stopper with respect to the fitting recess; (c) externally fitting a dust cover, which covers the piston rod, on the top end part of the bound stopper, while overlapping and mounting the dust cover on the engaging step; and then (d) applying an assembly external force upward in an axial direction against the pushing operation surface of the bound stopper positioned inside the fitting recess of the outer metal fitting and exposed facing downward in the axial direction inside the dust cover so as to push and assemble the top end part of the bound stopper, for which the dust cover is externally fit, into the fitting recess of the outer metal fitting.

According to this kind of manufacturing method of the present invention, when the dust cover is fit and assembled together with the bound stopper to the fitting recess of the outer metal fitting, the bound stopper for which the dust cover is mounted has assembly external force applied using the pushing operation surface exposed in the axial direction, and by doing this, it is possible to easily assembly to the fitting recess of the outer metal fitting. Also, with the vehicular dust cover assembly manufactured according to this kind of manufacturing method, the assembly part of the dust cover is protected by the outer metal fitting, so damage is prevented, a high level of design freedom is ensured for the shape of the outer circumferential surface of the outer metal fitting, and the same effects can be exhibited as the vehicular dust cover assembly constituted according to the present invention as described previously.

With the vehicular dust cover assembly constituted according to the present invention, the dust cover is fit and held together with the bound stopper in the fitting recess of the outer metal fitting, so the dust cover assembly part is protected by the outer metal fitting, and it is not necessary to provide a fitting surface of the dust cover at the outer circumferential surface of the outer metal fitting, and it is possible to design the shape of the outer metal fitting with a great deal of freedom.

Also, according to the method of the present invention, a bound stopper for which the dust cover is overlapped and assembled on the outer circumferential surface can be easily fit and assembled to the fitting recess of the outer metal fitting, and it is possible to easily manufacture the target vehicular dust cover assembly.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
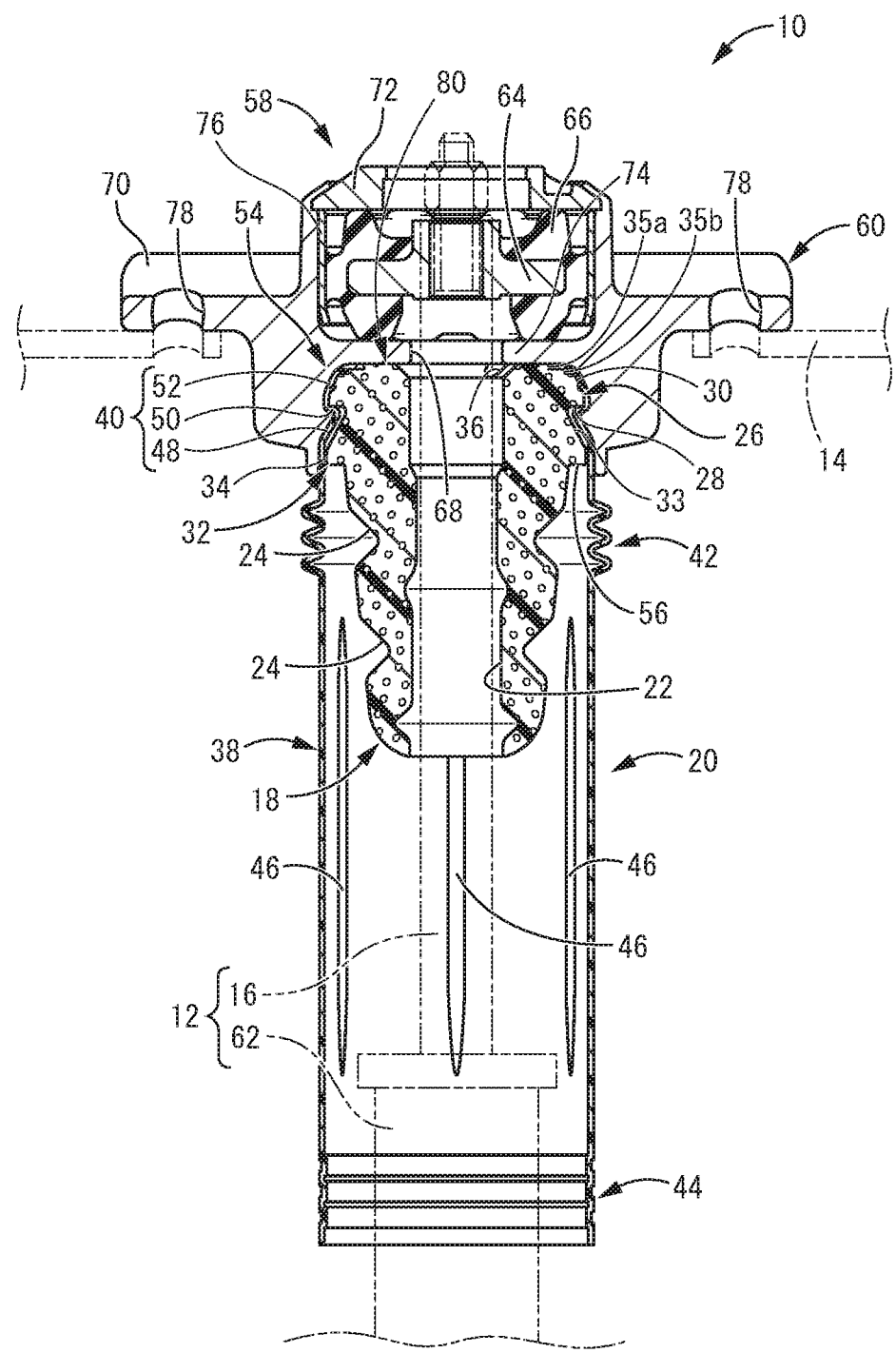
FIG. 1 is a vertical cross section view showing a vehicular dust cover assembly as a first embodiment of the present invention, taken along line 1-1 of FIG. 3.

Following, we will describe embodiments of the present invention while referring to the drawings.

FIG. 1 shows a vehicular dust cover assembly 10 as an embodiment of the present invention. The dust cover assembly 10 of this embodiment is mounted at an attachment site of a shock absorber 12 constituting the vehicular suspension mechanism to a vehicle body 14, and is constituted including a bound stopper 18 externally inserted and mounted on a piston rod 16 of the shock absorber 12, and a dust cover 20. With the description hereafter, as a rule, the vertical direction means the vertical direction in FIG. 1 which is the axial direction.

Figure 2:
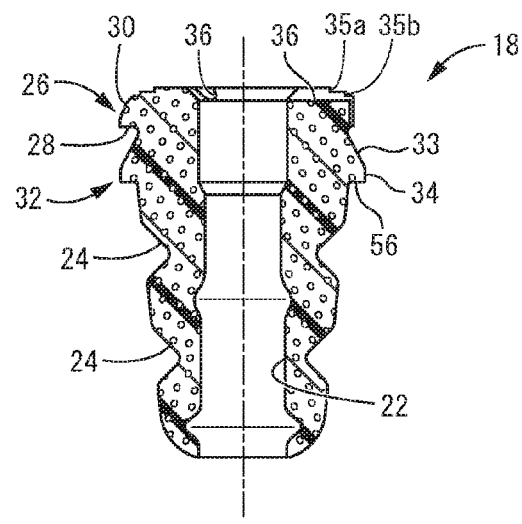
FIG. 2 is a vertical cross section view of a bound stopper constituting the dust cover assembly shown in FIG. 1, taken along line 2-2 of FIG. 3.
Figure 3:
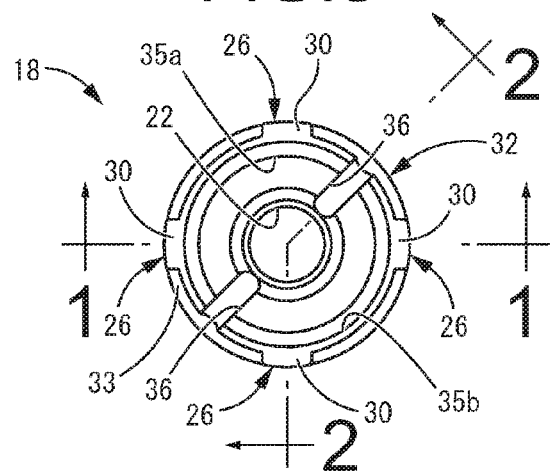
FIG. 3 is a plan view of the bound stopper shown in FIG. 2.
Figure 4:
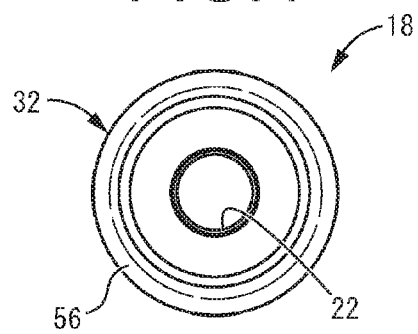
FIG. 4 is a bottom surface view of the bound stopper shown in FIG. 2.

In more specific detail, as shown in FIGS. 2 to 4, the bound stopper 18 is formed with an elastic body having a thick-walled, roughly round cylindrical shape equipped with a center hole 22, and can be formed using various types of synthetic resin or a rubber elastic body having sufficient elasticity, but with this embodiment, is formed using a foamed urethane resin.

The bound stopper 18 has a tapered shape for which the diameter becomes smaller as the outer circumferential surface faces downward, and has a tapered shape for which the diameter becomes larger as the inner circumferential surface faces downward, and the thickness dimension becomes gradually smaller facing downward in the axial direction. Also, on the outer circumferential surface lower than the medial part in the axial direction of the bound stopper 18, a plurality (with this embodiment, two) of annular concave grooves extending in the circumferential direction are formed separated by a designated gap in the axial direction, and a plurality of constricted parts 24 are provided in these concave grooves. Furthermore, on the inner circumferential surface below the medial part in the axial direction of the bound stopper 18, the annular concave grooves extending in the circumferential direction are formed alternately in relation to the outer circumferential surface concave grooves. By doing this, the overall bound stopper 18 has a bellows structure, and when there is compression deformation in the axial direction, buckling is prevented, and axial expansion/contraction deformation is generated stably.

Furthermore, on the top end part of the bound stopper 18, a thick walled projection 26 that projects on the outer circumferential surface is integrally formed. With this embodiment, thick walled projections 26 are formed respectively at four locations positioned at equal intervals in the circumferential direction. The bottom surface of this thick walled projection 26 is used as an engaging step 28 that expands in roughly the axis-perpendicular direction from the outer circumferential surface of the bound stopper 18. Meanwhile, the top surface of the thick walled projection 26, specifically, the outer circumferential surface above the engaging step 28 is used as an overlapping surface 30 having a curved tapered shape for which the diameter becomes gradually smaller facing upward.

Also, at the lower side than the engaging step 28 of the bound stopper 18, and at the upper side than the topmost constricted part 24, a projecting part 32 projecting on the outer circumferential surface is integrally formed along the entire circumference in the circumferential direction. With the projecting part 32 of this embodiment, while the external diameter dimension of the top end is roughly equal to the inner diameter dimension of the engaging step 28, the external diameter dimension of the bottom end is roughly equal to or slightly smaller than the outer diameter dimension of the engaging step 28. By doing this, the projecting part 32 is formed continuously from the inner circumferential end of the engaging step 28, and while a tapered surface 33 for which the diameter becomes gradually larger facing from upward to downward is provided on the outer circumferential surface above the projecting part 32, the outer circumferential surface below the projecting part 32 is used as a cylindrical surface 34 extending in the axial direction with a roughly fixed external diameter dimension. Furthermore, the bottom end surface of the projecting part 32 is an annular flat surface expanding in the axis-perpendicular direction, and is formed along the entire circumference of the circumferential direction having a designated width dimension.

At the top end surface of the bound stopper 18 of this embodiment, two annular steps 35a and 35b which are concentric at the radial medial part are formed, and with the bound stopper 18, the outer circumferential side in relation to each of the annular steps 35a and 35b has a step shaped top end surface that is slightly lower in the axial direction compared to the inner circumferential side. Also, at the top end surface of the bound stopper 18, at a suitable number of locations on the circumference (two locations with this embodiment), a communication groove 36 extending in the radial direction from the inner circumferential end to the outer circumferential end is formed. Furthermore, the outer circumferential end of the communication groove 36 continuously extends facing downward in the axial direction at a circumferential direction position away from the thick walled projection 26. Also, the bottom end opening of the bound stopper 18 is made to allow ventilation of air inside and outside the bound stopper 18 through the communication groove 36, even in a state with the bottom end opening of the bound stopper 18 covered by the shock absorber 12.

Figure 5:
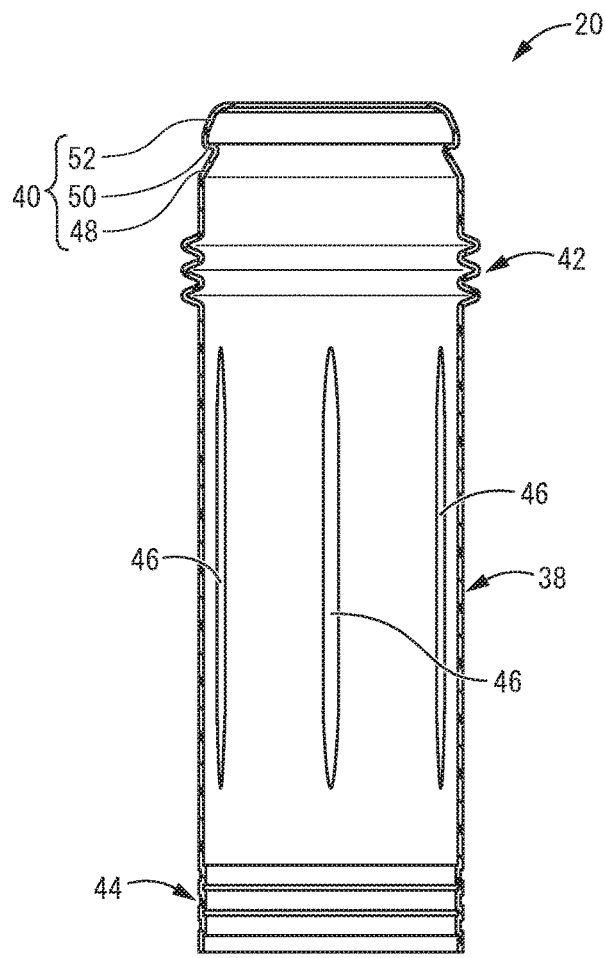
FIG. 5 is a vertical cross section view of the dust cover constituting the dust cover assembly shown in FIG. 1.
Figure 6:
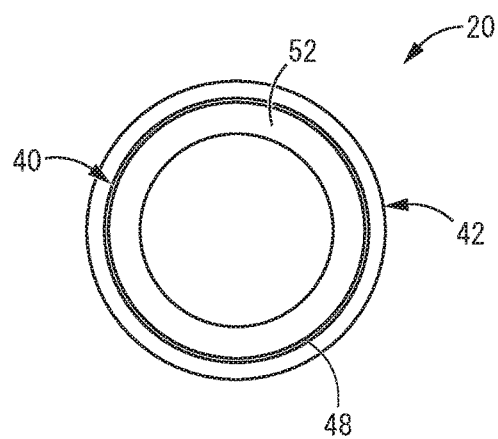
FIG. 6 is a plan view of the dust cover shown in FIG. 5.

Meanwhile, as shown in FIGS. 5 and 6, the dust cover 20 is a thin walled roughly round cylinder shape that extends vertically overall, and is formed using a synthetic resin material, rubber elastic body, or a composite material of synthetic resin and a rubber elastic body or the like. The material of the dust cover 20 is not particularly limited, and for example, it is preferable to use a thermoplastic synthetic resin such as polypropylene, polyethylene, polystyrene, polyvinyl chloride, polymethyl methacrylate, polyamide, polyester, polycarbonate, polyacetal, cellulose acetate or the like, or a thermoplastic vulcanized elastomer such as a vulcanized alloy of polypropylene and ethylene propylene rubber or the like. With this embodiment, as the material for the dust cover 20, a thermoplastic elastomer such as Santoprene (registered trademark) or the like is used.

The dust cover 20 of this embodiment is constituted including a body part 38 extending in the axial direction with a roughly fixed inner and outer diameter dimension, and an attachment part 40 that has a slightly smaller diameter than the body part 38 and extends from the top end of the body part 38 upward. At the axial medial part and the bottom end part of the body part 38, bellows parts 42 and 44 are formed having a bellows tube shape for which a plurality of annular convex parts and annular concave parts are alternately connected consecutively. With these bellows parts 42 and 44, the flexibility and elasticity of the dust cover 20 are improved. Also, on the inner circumferential surface of the body part 38, a plurality (with this embodiment, six) of ribs 46 extending in the axial direction at a designated length are integrally formed, and by doing this, the axial direction of the dust cover 20 is reinforced.

The attachment part 40 is a part assembled in an externally fit state overlapped on the outer circumferential surface of the bound stopper 18, and is constituted by a tapered part 48 for which the diameter becomes gradually smaller facing upward from the top end of the body part 38, an annular lower side locking part 50 that expands facing from the top end of the tapered part 48 to the radial direction outward, and a curved tapered tube shaped upper side locking part 52 extending facing upward from the outer circumferential end of the lower side locking part 50 and narrowed with the top end having the diameter gradually become smaller.

With the lower side locking part 50 of the attachment part 40, the inner diameter dimension is greater by a designated dimension than the inner diameter dimension øA (see FIG. 7) of the engaging step 28 of the bound stopper 18. Also, the inner circumferential surface shape of the upper side locking part 52 is formed having a shape corresponding to the outer circumferential surface shape of the thick walled projection 26 of the bound stopper 18.

Figure 7:
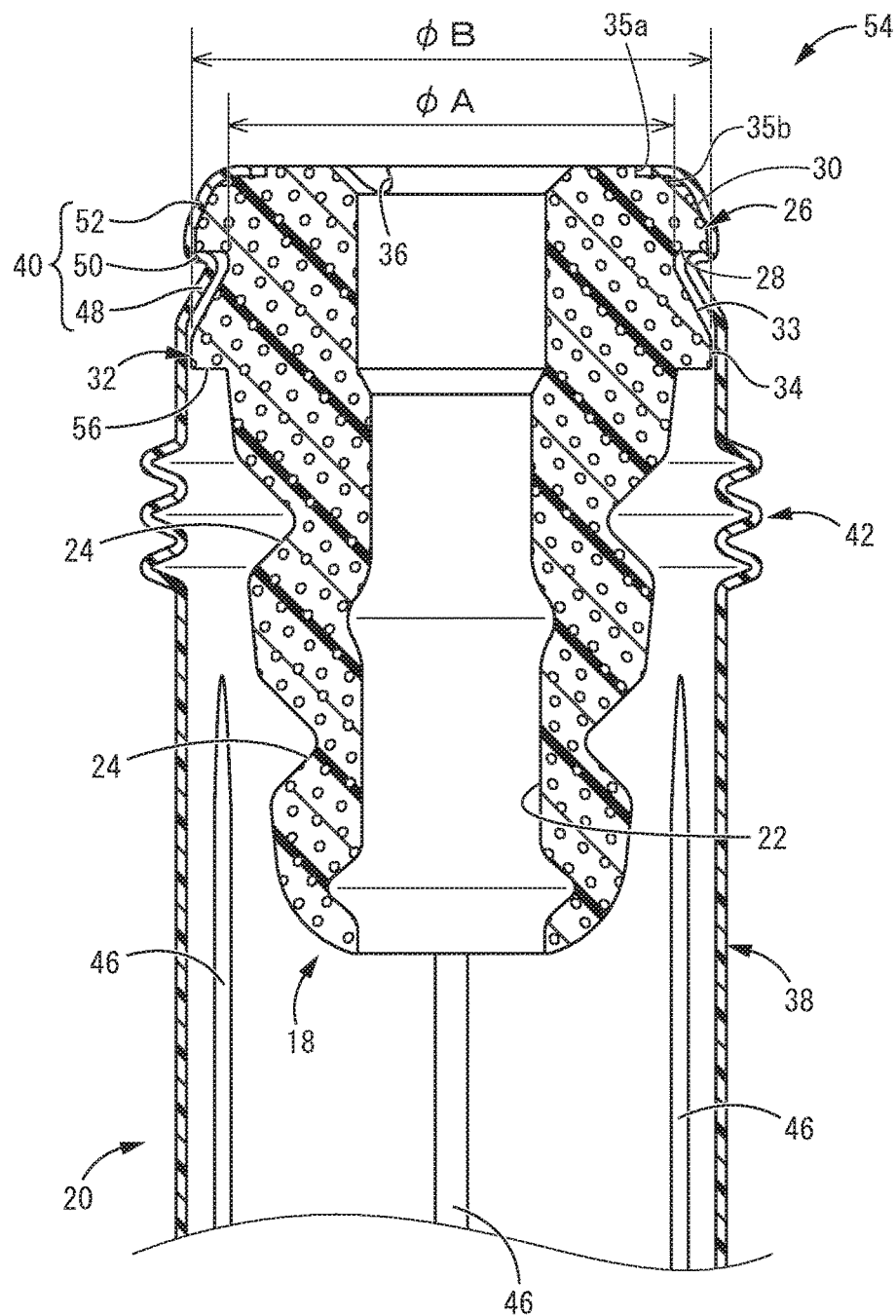
FIG. 7 is a vertical cross section view showing an expanded view of the main parts of the bound stopper shown in FIG. 2 and the dust cover shown in FIG. 5 in an assembled state.

Also, as shown by the fitting body 54 of the bound stopper 18 and the dust cover 20 in FIG. 7, by externally fitting the dust cover 20 from above the bound stopper 18, the attachment part 40 which is the top end part of the dust cover 20 can be made to be fit and assembled to the top end part on which the thick walled projection 26 of the bound stopper 18 is formed. In this assembled state, the lower side locking part 50 of the dust cover 20 is overlapped on the engaging step 28 of the thick walled projection 26 of the bound stopper 18, and the overlapping surface 30 of the thick walled projection 26 of the bound stopper 18 is covered and overlapped with the inner surface of the upper side locking part 52 of the dust cover 20. By doing this, the dust cover 20 is combined so as to sandwich from both sides in the axial direction in relation to the thick walled projection 26 of the bound stopper 18, and these are aligned to each other in the axial direction. Also, the inner surface of the attachment part 40 of the dust cover 20 is overlapped on the outer circumferential surface of the thick walled projection 26 of the bound stopper 18, and these are aligned to each other in the axis-perpendicular direction as well.

With this embodiment, the dust cover 20 overlapped on the top end surface of the bound stopper 18, by being overlapped at the radial medial part of the annular steps 35a and 35b, the positions of the top end surface of the bound stopper 18 and the top end surface of the dust cover 20 are roughly equal in the axial direction, and projection from the top end surface of the bound stopper 18 is avoided. Also, even in a dust cover 20 assembled state, the communication groove 36 formed on the surface of the top end part of the bound stopper 18 is maintained in that communication state. Furthermore, with this embodiment, by the thick walled projection 26 of the bound stopper 18 fit on the dust cover 20 being formed non-continuously on the circumference, it is possible to easily fit the thick walled projection 26 of the bound stopper 18 to the top end part of the dust cover 20. Also, as shown in FIG. 7, the inner diameter dimension of the body part 38 of the dust cover 20 is sufficiently greater than the outer diameter dimension of the bound stopper 18. Also, interference of the bound stopper 18 with the dust cover 20 is reduced during its axial compression deformation by space ensured in the outer circumference of the bound stopper 18 within the dust cover 20.

Also, in an assembled state of the bound stopper 18 and the dust cover 20, the tapered surface 33 of the projecting part 32 is positioned facing opposite the tapered part 48 of the attachment part 40 separated by a designated distance in the axial direction and the radial direction. Furthermore, the cylindrical surface 34 of the projecting part 32 and the inner circumferential surface of the dust cover 20 are in a zero touch contact state without pushing against each other, and preferably are positioned facing opposite separated by a designated distance in the radial direction. By doing this, the bound stopper 18 and the dust cover 20 are assembled in a non-compressed state in the radial direction at a lower side than the engaging step 28, and preferably, there is a free-deformation outer circumferential surface using the gap provided on the outer circumference. Furthermore, the bottom end surface of the projecting part 32 is exposed facing downward in the axial direction of the dust cover 20, and is an axial pushing operation surface 56 extending in the circumferential direction having an outer diameter dimension øB.

Furthermore, as shown in FIG. 1, the fitting body 54 of the bound stopper 18 and the dust cover 20 combined with each other on the same center axis in this way are assembled to an outer metal fitting 60 of an upper support 58. The upper support 58 is an item mounted to an attachment site of the piston rod 16 to the vehicle body 14 provided projecting upward from a cylinder 62 on the shock absorber 12. Specifically, said another way, the bound stopper 18 and the dust cover 20 are assembled in a state externally inserted onto the piston rod 16 projecting downward from the upper support 58.

The specific structure of this upper support 58 is not limited, but as shown in FIG. 1, for example, an inner metal fitting 64 and the outer metal fitting 60 arranged at its outer circumferential side have a structure elastically coupled by a main rubber elastic body 66. With the inner metal fitting 64, the top end of the piston rod 16 of the shock absorber 12 is attached by fixing with a bolt, and is a thick walled board shape that expands in the axis-perpendicular direction. The outer metal fitting 60 has a hollow structure equipped with a center insertion hole 68 that the piston rod 16 is inserted through, and on the outer circumferential surface, a flange shaped fixing part 70 fixed by a bolt overlapping the vehicle body 14 is integrally formed expanding outward. Also, on the outer metal fitting 60, upper side and lower side support parts 72 and 74 are provided positioned facing opposite at both sides of the axial direction to the outer circumferential part of the inner metal fitting 64, and between opposite facing surfaces in the axial direction of these upper side and lower side support parts 72 and 74 and the inner metal fitting 64 are respectively elastically coupled by the main rubber elastic body 66. Also, between the opposite facing surfaces in the radial direction of the inner metal fitting 64 and the outer metal fitting 60 are elastically coupled by the main rubber elastic body 66. A press fit cylindrical metal fitting 76 is adhered by vulcanization to the outer circumferential surface of the main rubber elastic body 66, and the press fit cylindrical metal fitting 76 is fixed by being press fit to the outer metal fitting 60. The upper side support part 72 of the outer metal fitting 60 is formed separately with an annular plate shape, and is fixed by crimping to the top end opening part of the outer metal fitting 60.

Here, the materials and the manufacturing method of the outer metal fitting 60 of the upper support 58 are not limited in any way, but with this embodiment, the outer metal fitting 60 is a die cast molded article made of an aluminum alloy. By doing this, it is possible to make this lighter while ensuring sufficient strength, and it is possible to have a greater degree of design freedom for the wall thickness dimension and shape than with press forming, and to keep the manufacturing error low.

Also, by having the outer metal fitting 60 for which a bolt is inserted through a bolt hole 78 provided on the fixing part 70 of the outer metal fitting 60 fixed by a bolt to the vehicle body 14, the piston rod 16 fixed by a bolt to the inner metal fitting 64 is attached with vibration damping coupling to the vehicle body 14 via the upper support 58.

Figure 8:
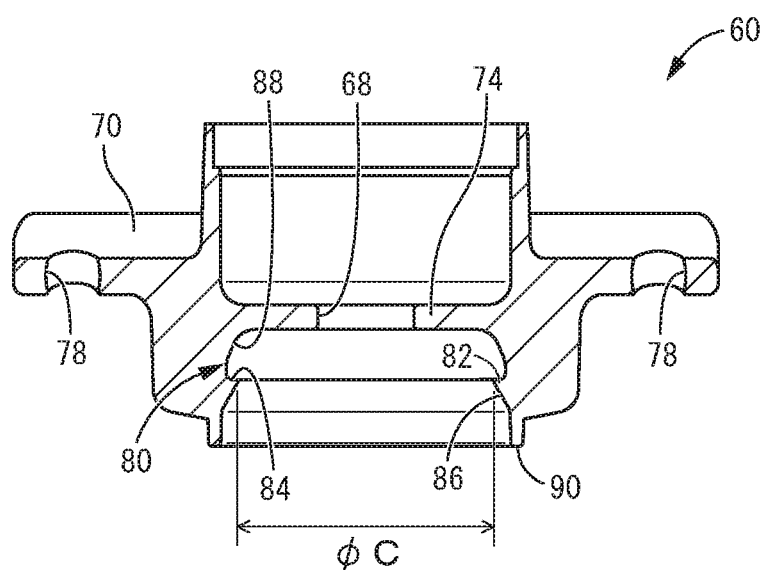
FIG. 8 is a vertical cross section view showing an upper support outer metal fitting constituting the dust cover assembly shown in FIG. 1.

Also, as shown in FIG. 8, on the outer metal fitting 60, by the peripheral wall part extending to the lower side in the axial direction than the lower side support part 74, a fitting recess 80 assembled with the top end part of the bound stopper 18 for which the dust cover 20 is externally fit being fit in is formed open downward in the axial direction. The inner surface of this fitting recess 80 is formed having a shape corresponding to the surface shape of the top end part of the bound stopper 18 on which the dust cover 20 is externally fit.

In particular, on the inner surface of the fitting recess 80, an engaging projection 82 extending at the axial medial part in the circumferential direction is provided projecting in an annular shape extending along the entire circumference with this embodiment. The inner diameter dimension of this engaging projection 82 is øC, and with this embodiment, it is smaller than the outer diameter dimension øB of the pushing operation surface 56, and is greater than the inner diameter dimension øA of the engaging step 28. Also, the engaging projection 82 is a roughly triangle shaped cross section, and the surface located at the top side than the projection apex which is the inner circumferential end is an annular engaging surface 84 that expands in roughly the axis-perpendicular direction. Meanwhile, the surface located at the lower side than the projection apex is a tapered guide surface 86 for which the diameter gradually expands facing downward. Furthermore, the inner circumferential surface upward from the engaging projection 82 of the fitting recess 80 is a curved taper shaped abutting surface 88 that narrows gradually facing upward.

By doing this, by the top end part of the bound stopper 18 on which the dust cover 20 is externally fit being fit from below in the axial direction in relation to the fitting recess 80, as shown in FIG. 1, the top end part of the bound stopper 18 is fit and assembled to the fitting recess 80. In this assembled state, the engaging step 28 of the thick walled projection 26 of the bound stopper 18 is overlapped and engaged with the engaging surface 84 of the engaging projection 82 of the outer metal fitting 60, and the overlapping surface 30 of the thick walled projection 26 of the bound stopper 18 is overlapped and engaged with the abutting surface 88 of the fitting recess 80 of the outer metal fitting 60. Also, for either the engaging step 28 and the engaging surface 84, as well as the overlapping surface 30 and the abutting surface 88, the dust cover 20 is sandwiched and held between the overlapping surfaces of the bound stopper 18 and the outer metal fitting 60.

By doing this, the outer metal fitting 60 is attached such that the thick walled projection 26 of the bound stopper 18 on which the dust cover 20 is externally fit is sandwiched from both sides in the axial direction, and these are aligned to each other in the axial direction and the axis-perpendicular direction. Said another way, the bound stopper 18 and the dust cover 20 are held to be retained in relation to the outer metal fitting 60.

Here, the projecting part 32 of the bound stopper 18 is positioned inside the fitting recess 80 of the outer metal fitting 60, specifically, the pushing operation surface 56 which is the bottom end surface of the projecting part 32 is positioned upward in the axial direction than the opening end surface 90 at the fitting recess 80 of the outer metal fitting 60. The pushing operation surface 56 is not covered by the dust cover 20 and is exposed downward in the axial direction, so by using a tool pushed on the pushing operation surface 56 inserted from below the dust cover 20, it is possible to directly apply assembly external force in the axial direction on the pushing operation surface 56 of the bound stopper 18. Because of that, it is possible to easily and quickly push in and assemble the fitting body 54 of the bound stopper 18 and the dust cover 20 in the fitting recess 80 of the outer metal fitting 60. In particular, since the pushing operation surface 56 is provided inside the fitting recess 80, even if this is pushed in from an inclined direction in relation to the axial direction, it is possible to assemble the fitting body 54 in the outer metal fitting 60 stably.

In particular with this embodiment, the tapered guide surface 86 is formed, and the top end part of the bound stopper 18 covered by the dust cover 20 is guided smoothly so as to slide into the fitting recess 80. In specific terms, the overlapping surface 30 which is the top end surface of the bound stopper 18 and the guide surface 86 are given a tapered shape, so when the fitting body 54 is assembled to the outer metal fitting 60, having these overlapping surface 30 and the guide surface 86 be pressed against each other in the axial direction can be avoided. Specifically, a reverse direction external force is applied inclined in relation to the axial direction on both surfaces 30 and 86, both surfaces 30 and 86 abut each other, the top end part of the bound stopper 18 is pushed into the interior of the fitting recess 80 so as to slide.

Furthermore, as shown in FIG. 1, the assembly part of the dust cover 20 to the outer metal fitting 60, specifically, the fitting recess 80 of the outer metal fitting 60 in which the top end part of the dust cover 20 is pushed is covered by the outer metal fitting 60 and protected. By doing this, it is possible to prevent damage to the assembly part by splashing of stones or the like, and it is also possible to reduce the risk of the dust cover 20 falling off.

Furthermore, with this embodiment, the outer diameter dimension øB of the pushing operation surface 56 is greater than the inner diameter dimension øC at the engaging projection 82 of the outer metal fitting 60, so at the lower side of the engaging step 28, it is possible to ensure a sufficiently large surface area of the pushing operation surface 56. By doing this, local concentration of stress when pushing the pushing operation surface 56 upward in the axial direction is avoided, so durability of the bound stopper 18 is improved, and it is possible to assemble the fitting body 54 and the outer metal fitting 60 with even greater pushing force.

Furthermore, with this embodiment, the pushing operation surface 56 is provided at the upper side than the topmost constricted part 24 of the plurality of constricted parts 24 provided on the outer circumferential surface of the bound stopper 18, so it is possible to inhibit plastic deformation type damage at the lower side than the constricted part 24 of the bound stopper 18 when the pushing operation surface 56 is pushed upward in the axial direction. By doing this, the elastic characteristics of the bound stopper 18 are maintained, and the expected characteristics can be exhibited.

Also, with this embodiment, at the lower side of the engaging step 28, the bound stopper 18 and the dust cover 20 are assembled in a non-compressed state, so with assembly of the bound stopper 18 and the dust cover 20, the occurrence of friction due to abutting of the projecting part 32 on the inner surface of the dust cover 20 is avoided, or friction force is suppressed to a low level. By doing this, having the projecting part 32 cause resistance to assembly of the bound stopper 18 and the dust cover 20 is avoided, and it is possible to easily realize assembly of these.

With the dust cover assembly 10 of this embodiment constituted in this way, it is easy to implement assembly of the bound stopper 18, the dust cover 20, and the outer metal fitting 60. Specifically, with this embodiment, a soft thermoplastic elastomer is used as the material for the dust cover 20. When this kind of soft dust cover 20 is used, as the manufacturing procedure for the dust cover assembly 10, for example, first, the bound stopper 18 and the dust cover 20 are separately formed and prepared using foaming type molding and blow molding. After that, the tip end part of the bound stopper 18 is press fit on the tip end part of the dust cover 20 and overlapped to make the fitting body 54. Also, by the tip end part of this fitting body 54 being press fit and fit into the fitting recess 80 of the outer metal fitting 60, the dust cover assembly 10 is manufactured.

As with this embodiment, by press fitting and assembling a soft material dust cover 20 to the outer metal fitting 60, it is not necessary to do setting of a large size outer metal fitting 60 inside the metal mold when manufacturing the dust cover assembly 10, and manufacturing costs can be reduced. Also, by using a soft material for the dust cover 20, when press fitting the bound stopper 18 on the dust cover 20, it is possible to compress the dust cover 20 and assemble the bound stopper 18 thereto. By doing this, the bound stopper 18 and the dust cover 20 can be easily assembled. In particular, with this embodiment, by providing bellows parts 42 and 44 on the body part 38 of the dust cover 20, flexibility and elasticity are improved, and assembly of the bound stopper 18 and the dust cover 20 can be even easier.

Furthermore, during assembly of the bound stopper 18, the dust cover 20, and the outer metal fitting 60, the parts that are individually abutted in sequence, specifically, the overlapping surface 30 and the tapered part 48, and the upper side locking part 52 and the guide surface 86 are respectively tapered. By doing this, it is possible to inhibit external force for fitting, and possible to make assembly even easier. In particular, the bottom end surface of the projecting part 32 is used as the pushing operation surface 56, so using the part that can be pressed in from below the pushing operation surface 56 to push the fitting body 54 of the bound stopper 18 and the dust cover 20 into the fitting recess 80, it is possible to perform assembly more easily.

Also, by the thick walled projection 26 of the bound stopper 18 being covered by the attachment part 40 of the dust cover 20, the bound stopper 18 and the dust cover 20 are aligned to each other and fixed. In addition to that, by the attachment part 40 of the dust cover 20 being covered by the fitting recess 80 of the outer metal fitting 60, the dust cover 20 and the outer metal fitting 60 are aligned to each other and fixed. By doing this, falling out of the bound stopper 18 downward from the dust cover 20, and falling out of the dust cover 20 downward from the outer metal fitting 60 can be effectively limited.

From the above, the dust cover assembly 10 of this embodiment is assembled very easily, and since each part is constituted so as to not fall out easily, it is possible to achieve both a reduction in manufacturing costs and high level productivity.

Above, we gave a detailed description of embodiments of the present invention, but the present invention is not limited by those specific descriptions. For example, the manufacturing procedure of the dust cover assembly 10 described previously is a simple example for illustration, and is not limiting in any way.

Furthermore, the shape of the thick walled projection 26 of the bound stopper 18 and the shape of the engaging projection 82 of the outer metal fitting 60 are not limited to the shapes shown in the drawings, and can also be a hemisphere shape or the like, for example. In this case, the shape of the attachment part 40 of the dust cover 20 covering the thick walled projection 26 and the shape of the tapered part 48 and the lower side locking part 50 of the dust cover 20 that engages with the engaging projection 82 are preferably shapes that respectively correspond to the thick walled projection 26 and the engaging projection 82.

Furthermore, with the embodiments noted above, the thick walled projection 26 is provided at four locations at equal intervals on the circumference of the top end part of the bound stopper 18, but the invention is not limited to this form. For example, the number of thick walled projections provided on the circumference is not limited in any way, and it is also possible to have the intervals at which they are provided be uneven. Furthermore, it is also possible to have the thick walled projection provided along the entire circumference of the top end part of the bound stopper 18. By doing this, the engaging step is provided along the entire circumference of the top end part of the bound stopper 18, and by the engaging action of the lower side locking part 50 of the dust cover 20 similarly provided along the entire circumference with the engaging projection 82 of the outer metal fitting 60, it is possible to even more effectively prevent falling out of the bound stopper 18 downward.

Meanwhile, it is not necessary to provide the engaging projection 82 provided on the outer metal fitting 60 along the entire circumference, and at the inner surface of the fitting recess 80, it is also possible to provide the engaging projection 82 partially in the circumferential direction. Also, it is not necessary to provide the tapered part 48 and the lower side locking part 50 that engaging with the engaging projection 82 along the entire circumference, and for example, it is also possible to provide them at positions in the circumferential direction corresponding to the engaging projection 82. By doing this, it is possible to suppress the external force needed for assembling the fitting body 54 to the outer metal fitting 60, making it possible to make assembly even easier.

Also, with the embodiment noted above, the dust cover 20 was made to be a soft material, but it is also possible to form it using a hard synthetic resin such as polypropylene or the like. In that case, for example, it is also possible to have the dust cover 20 be hard in parts, such as with a soft material for the attachment part 40 of the dust cover 20, having the body part 38 be a hard material and the like.

Furthermore, with the embodiments noted above, the pushing operation surface 56 is formed along the entire circumference in the circumferential direction, and is a flat surface extending in the axis-perpendicular direction, but that is not necessary, and for example, it is also possible to form a plurality of these partially in the circumferential direction. Furthermore, the pushing operation surface can also be a tapered surface inclined in the axial direction, and in that case, it is preferable that it have an inverted circular truncated cone shape with the inner circumferential side positioned below compared to the outer circumferential side. Also, it is also possible to assemble the fitting body 54 and the outer metal fitting 60 by using a tool or the like to push this tapered surface upward in the axial direction. The pushing operation surface 56 in the embodiments noted above is positioned at the upper side than the topmost constricted part 24, but the present invention is not limited to this mode. Naturally, it is also not essential to have a constricted part with the bound stopper with the present invention.

Furthermore, with the embodiment noted above, at the lower side than the engaging step 28 of the bound stopper 18, a designated distance between facing surfaces is provided between the tapered surface 33 and the cylindrical surface 34 which are the outer circumferential surface of the projecting part 32 and the inner circumferential surface of the dust cover 20, but this is not necessary, and for example, it is also possible to have these abut with zero touch.

With the embodiment noted above, the projecting part 32 projecting to the outer circumferential side is provided at the outer circumferential surface of the bound stopper 18, and the bottom end surface is used as the pushing operation surface 56, but the projecting part 32 is not essential. Specifically, for example, it is also possible to provide a step surface that expands in the axis-perpendicular direction at the lower side than the engaging step 28, and to have that step surface be the pushing operation surface. Alternatively, it is also possible to not provide that step surface, and to have the outer circumferential surface of the bound stopper which is a tapered surface be the pushing operation surface.

What is claimed is:

1. A vehicular dust cover assembly comprising:
   an upper support configured to mount a shock absorber to a vehicle body;
   a bound stopper and a dust cover assembled to the upper support; and
   an engaging step provided on an outer circumferential surface of the bound stopper, wherein
   a top end part of the dust cover is externally fit to a top end part of the bound stopper while being overlapped on the engaging step,
   the upper support includes an outer metal fitting configured to be fixed to the vehicle body, and having a fitting recess within which the top end part of the bound stopper is fit and assembled,
   an engaging projection is provided projecting on an inner surface of the fitting recess and the engaging projection is engaged with the engaging step with the dust cover interposed therebetween so that the bound stopper and the dust cover are retained and held in relation to the outer metal fitting, and
   the bound stopper includes an axial pushing operation surface exposed facing downward in an axial direction of the dust cover, the pushing operation surface being provided at a lower side than the engaging step of the bound stopper and at a position inside the fitting recess of the outer metal fitting.

2. The vehicular dust cover assembly according to claim 1, wherein the engaging projection of the outer metal fitting includes an engaging surface located at a top side than its apex and overlapping the engaging step of the bound stopper with the dust cover interposed therebetween and a tapered guide surface that gradually expands facing downward located at a lower side than the apex, and an external diameter dimension of the pushing operation surface is made to be larger than an inner diameter dimension of the engaging projection of the outer metal fitting.

3. The vehicular dust cover assembly according to claim 1, wherein the outer metal fitting includes a tapered abutting surface that gradually narrows facing upward provided on an inner circumferential surface upward from the engaging projection in the fitting recess thereof,
the bound stopper includes a tapered overlapping surface that gradually narrows facing upward on the outer circumferential surface upward from the engaging step, and
the overlapping surface of the bound stopper is covered by the top end part of the dust cover while being overlapped on the abutting surface of the outer metal fitting sandwiching the dust cover.

4. The vehicular dust cover assembly according to claim 1, wherein the engaging step of the bound stopper and the engaging projection of the outer metal fitting are both formed along an entire circumference in a circumferential direction.

5. The vehicular dust cover assembly according to claim 1, wherein the pushing operation surface of the bound stopper is formed along an entire circumference in a circumferential direction.

6. The vehicular dust cover assembly according to claim 1, wherein the bound stopper includes a groove-shaped constricted part extending in a circumferential direction provided on the outer circumferential surface thereof, and the pushing operation surface is located to an upper side than the constricted part.

7. The vehicular dust cover assembly according to claim 1, wherein at the lower side than the engaging step of the bound stopper, the bound stopper inserted internally in the dust cover inside the fitting recess of the outer metal fitting is assembled in a non-compressed state in a radial direction without pressing on an inner circumferential surface of the dust cover.

8. The vehicular dust cover assembly according to claim 1, wherein the outer metal fitting is a die cast molded article of an aluminum alloy.

9. The vehicular dust cover assembly according to claim 1, wherein the dust cover is made of an elastomer.

10. A manufacturing method of a vehicular dust cover assembly including an upper support configured to be mounted on a vehicle body and a bound stopper configured to be externally inserted and mounted on a piston rod of a shock absorber, upon fitting and assembling a top end part of the bound stopper into a fitting recess of an outer metal fitting of the upper support, the method comprising steps of:

preparing the bound stopper to have an engaging step provided on its outer circumferential surface, and a pushing operation surface with a larger outer diameter than an inner diameter of the engaging step provided at a lower side than the engaging step;

preparing the outer metal fitting to have an engaging projection provided projecting on an inner surface of the fitting recess, the engaging projection being configured to be engaged with the engaging step of the bound stopper so as to retain and hold the bound stopper with respect to the fitting recess;

externally fitting a dust cover, which covers the piston rod, on the top end part of the bound stopper, while overlapping and mounting the dust cover on the engaging step; and then applying an assembly external force upward in an axial direction against the pushing operation surface of the bound stopper positioned inside the fitting recess of the outer metal fitting and exposed facing downward in the axial direction inside the dust cover so as to push and assemble the top end part of the bound stopper, for which the dust cover is externally fit, into the fitting recess of the outer metal fitting.

* * * * *